June 3, 1930.　　　　E. HECKER　　　　1,761,727
APPARATUS FOR PROCESSING AND COOKING DRIED FRUIT
Filed Nov. 17, 1927
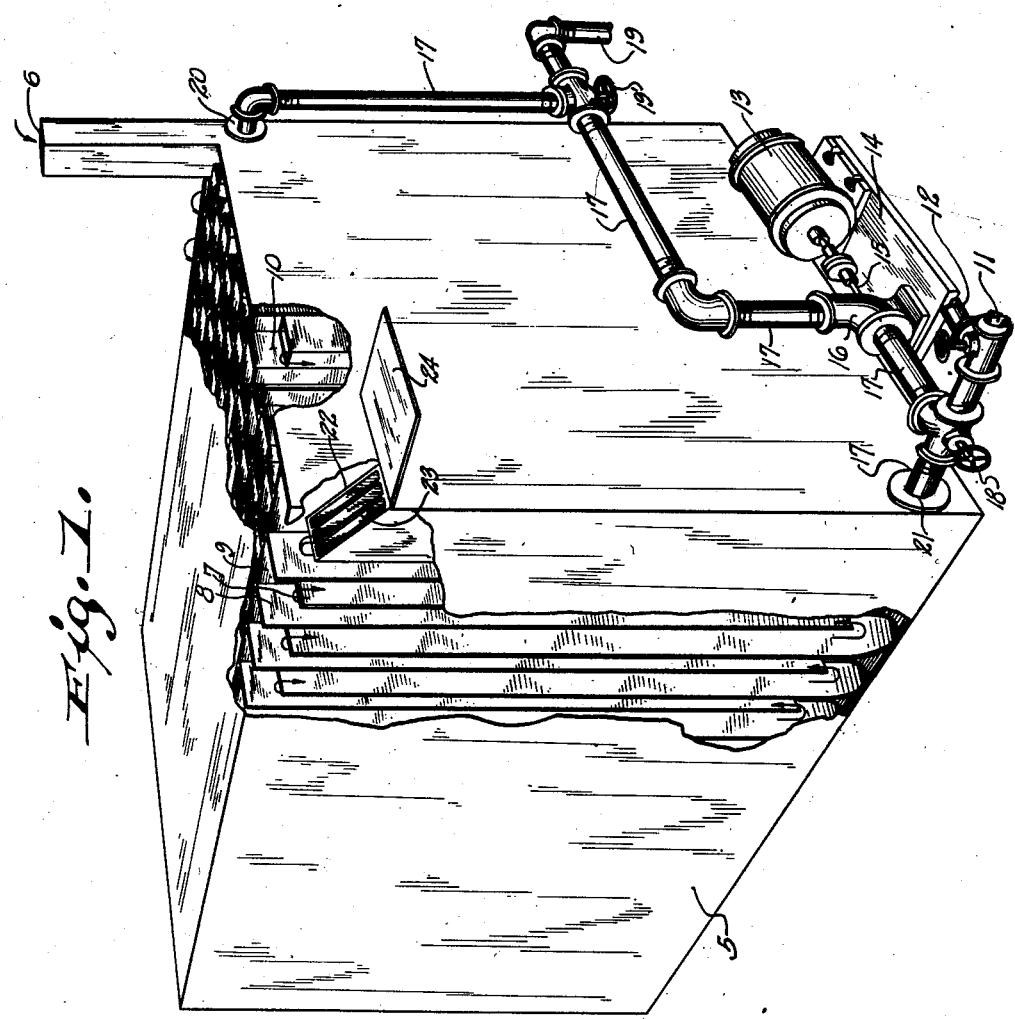
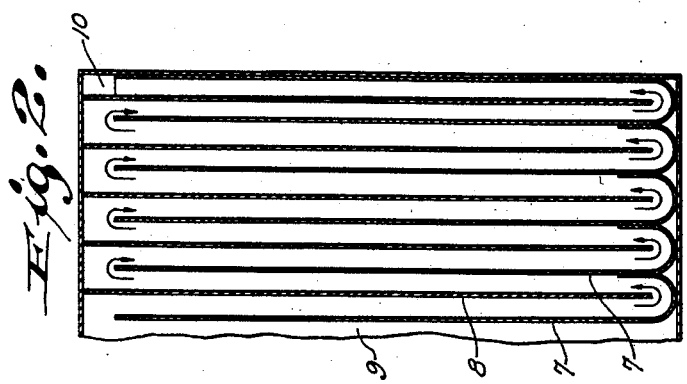
INVENTOR.
Ernst Hecker,
BY Morsell, Keeney & Morsell
ATTORNEYS Patented June 3, 1930

1,761,727

UNITED STATES PATENT OFFICE

ERNST HECKER, OF MILWAUKEE, WISCONSIN

APPARATUS FOR PROCESSING AND COOKING DRIED FRUIT

Application filed November 17, 1927. Serial No. 234,002.

This invention relates to apparatus for processing and cooking dried fruit, and is more particularly adapted to the processing and cooking of prunes.

It is one of the objects of this invention to provide an apparatus for processing and cooking dried fruit which is automatic in operation.

It is a further object of this invention to provide an apparatus for and method of processing and cooking dried fruit which subjects the fruit to the action of hot water for a considerable length of time, and which automatically delivers the fruit when the process is completed.

It is a further object of this invention to provide an apparatus for processing and cooking dried fruit which is constructed with a plurality of connected passage-ways through which the dried fruit is automatically carried.

It is a further object of this invention to provide an apparatus for processing and cooking dried fruit which delivers the processed fruit in a conitnuous flow.

It is a further object of this invention to provide a method of processing and cooking dried fruit which subjects the fruit to a lengthy processing to effectively remove all air from the fruit and to cause the fruit to swell.

A further object of this invention is to provide an apparatus for and method of processing and cooking dried fruit which is simple, effective, and well adapted for the purpose described.

With the above and other objects in view, the invention consists in the improved apparatus for cooking dried fruit, and all its parts and combinations as set forth in the claims and all equivalents thereof.

In the accompanying drawing, in which the same reference characters designate the same parts in all of the views:

Fig. 1 is a perspective view of the improved apparatus for carrying out the hereinafter described method, parts being broken away; and Fig. 2 is a sectional view taken through portion of the interior of the apparatus, showing the construction of the passageways.

Referring to the drawing, the numeral 5 designates an outer casing having an upstanding port 6, through which the prunes or other fruit to be processed and cooked, are fed. Within the casing are a plurality of partitions 7, the upper ends of which terminate a short distance below the top of the casing 5. The lower ends of the partitions 7 are hook shaped, and are curved around to meet the adjacent partition 7. Between each pair of partitions 7 is a partition 8 which extends from the top of the casing 5 to a short distance from the bottom of the casing. The partitions 7 and 8 are arranged in rows running lengthwise of the casing, and each row is separated from the adjacent row by partitions 9. The partitions 9 have a portion cut away to form an opening 10 at one end, preferably an upper end, to allow an entry into the adjacent row.

A water inlet pipe 11 is provided, and also a steam inlet pipe 12. A motor 13 of any ordinary type is mounted on a plate 14 adjacent the casing, and a drive shaft 15, extending from the motor enters the elbow 16 and operates a pump of ordinary type, which may consist of a propeller within the elbow. The pump causes the water, which is heated by being mixed with the steam, to circulate through the pipes 17 in the direction indicated by the arrows in Fig. 1. When the casing has been entirely filled with the hot water, the valve 18 is manipulated to cut off the entry of water from the pipe 11. The water within the device may then be used over and over again as long as it is desired. A drain pipe 19 is provided and is arranged so that when the valve 19 is opened a change of water may be readily accomplished. A water inlet opening 20, and an outlet opening 21 are provided in the casing to which the ends of the series of pipes 17 are connected.

The last set of partitions between which the water flows is formed with an inclined head 22, having a grating 23 thereon. The grating allows the water to pass through, without permitting the prunes to do the same. The latter roll down the incline upon the delivery tray 24.

The method of processing and cooking the prunes is as follows: The drain valve 19' is closed, and the inlet valve 18 is opened. Water and steam flow in from the pipes 11 and 12 through the pipes 17. The pump causes the water to enter the inlet opening 20 and circulate through the passageways. When sufficient water has been admitted to fill the casing, the valve 18 is closed and the water, which is discharged from the opening 21 will again pass through the pipes 17 and back into the inlet 20. Thus the same water may be used as long as it is desired. The water should be at a temperature of approximately 200 degrees F. After the apparatus has been prepared the next step is to feed prunes which have been previously soaked and cleansed, into the opening 6. They may be fed continuously and will be carried by the circulating water up and down each passageway. The action of the hot water upon the prunes causes them to swell and also removes all air. This latter action is necessary as the prunes will not keep unless all air bubbles within them are extracted. It takes each prune approximately twenty minutes to pass from the inlet 6 to the tray 24. This provides ample time for thorough processing. When the prunes are delivered on the tray 24 they are completely processed, but only partially cooked.

The next step is to feed the prunes into a second apparatus of identical construction with the apparatus illustrated. The only difference in the second stage is that the water used is of a higher temperature, preferably between 212 degrees and 215 degrees F. When the prunes are delivered by the second apparatus the cooking process is completed and the product is then ready for bottling.

From the foregoing description, it may be seen that the improved apparatus for and method of processing and cooking prunes is simple, thorough, automatic, and well adapted for the purpose described.

What I claim is:

1. An apparatus for cooking and processing food material, comprising a casing having a fluid inlet and an opening for receiving the food material, and a common means for cooking the food material and for carrying it through the casing to a point of delivery.

2. An apparatus for cooking and processing food material, comprising a casing having a water inlet and a feed opening for receiving the food material, said casing being constructed with a plurality of passageways therein, and means for circulating a heated fluid through said passageways, said fluid carrying the food material along and cooking it simultaneously, said food material being automatically delivered when its travel through the passageways has been completed.

3. An apparatus for cooking and processing food material, comprising a casing having a water inlet and a feed opening for receiving the food material, said casing being constructed with a plurality of passageways therein, and a pump for circulating a heated fluid through said passageways to carry the food material along and to cook it simultaneously, said food material being automatically delivered when its travel through the passageways has been completed.

4. An apparatus for cooking and processing food material, comprising a casing having a water inlet and a feed opening for receiving the food material, said casing being constructed with a plurality of rows of parallel and connected passageways therein, and means for circulating a heated fluid through said passageways to carry the food material along and to cook it simultaneously, said food material being automatically delivered when its travel through said passageways has been completed.

5. An apparatus for cooking and processing food material, comprising a casing having a water inlet, a water outlet, a feed opening for the food material, and a discharge opening for the food material, said casing also being constructed with a plurality of partitions to form passageways, the partitions of one of said passageways having an inclined upper portion, a grating on said inclined portion, and means for circulating hot water through said passageways to carry the food material along and to cook it simultaneously, the food material, after it has completed its course, rolling down over said grating to the discharge opening, and the water passing through said grating.

In testimony whereof, I affix my signature.

ERNST HECKER.